(12) United States Patent
Dhuler

(10) Patent No.: US 6,215,644 B1
(45) Date of Patent: Apr. 10, 2001

(54) HIGH FREQUENCY TUNABLE CAPACITORS

(75) Inventor: Vijayakumar R. Dhuler, Raleigh, NC (US)

(73) Assignee: JDS Uniphase Inc. (CA)

(*) Notice: Subject to any disclaimer, the term of this patent is extended or adjusted under 35 U.S.C. 154(b) by 0 days.

(21) Appl. No.: 09/392,987

(22) Filed: Sep. 9, 1999

(51) Int. Cl.$^7$ ...................................... H01G 7/00

(52) U.S. Cl. .................. 361/280; 361/281; 361/282

(58) Field of Search .................... 361/277, 278, 361/280–282, 287, 290, 292, 298.2, 291

(56) References Cited

U.S. PATENT DOCUMENTS

| | | |
|---|---|---|
| 3,646,413 | 2/1972 | Oomen . |
| 3,796,976 | 3/1974 | Heng et al. . |
| 3,903,459 * | 9/1975 | Kawasumi ........................ 361/293 |
| 4,141,080 | 2/1979 | Paul et al. . |
| 4,244,722 | 1/1981 | Tsuya et al. . |
| 4,480,254 | 10/1984 | Spencer et al. . |
| 4,516,091 | 5/1985 | Sasser . |
| 4,554,519 | 11/1985 | Adam . |
| 4,619,001 | 10/1986 | Kane . |
| 4,692,727 | 9/1987 | Wakino et al. . |
| 4,782,313 | 11/1988 | Brant, Jr. . |
| 4,849,722 | 7/1989 | Cruchon et al. . |
| 4,853,660 | 8/1989 | Schloemann . |
| 5,015,906 * | 5/1991 | Cho et al. ........................ 310/309 |
| 5,075,600 | 12/1991 | El-Hamamsy et al. . |
| 5,162,977 | 11/1992 | Paurus et al. . |
| 5,164,688 | 11/1992 | Larson . |
| 5,168,249 | 12/1992 | Larson . |
| 5,258,591 | 11/1993 | Buck . |
| 5,312,790 | 5/1994 | Sengupta et al. . |
| 5,367,136 | 11/1994 | Buck . |
| 5,406,233 | 4/1995 | Shih et al. . |
| 5,467,067 | 11/1995 | Field et al. . |
| 5,479,042 | 12/1995 | James et al. . |
| 5,504,466 | 4/1996 | Chan-Son-Lint et al. . |
| 5,543,765 | 8/1996 | Cachier . |
| 5,568,106 | 10/1996 | Fang et al. . |
| 5,578,976 | 11/1996 | Yao . |
| 5,587,943 | 12/1996 | Torok et al. . |
| 5,589,845 | 12/1996 | Yandrofski et al. . |
| 5,607,631 | 3/1997 | Wolfson et al. . |
| 5,640,042 | 6/1997 | Koscica et al. . |
| 5,640,133 | 6/1997 | MacDonald et al. . |
| 5,677,823 | 10/1997 | Smith . |
| 5,696,662 | 12/1997 | Bauhahn . |
| 5,721,194 | 2/1998 | Yandrofski et al. . |
| 5,770,546 | 6/1998 | Grothe et al. . |
| 5,808,527 | 9/1998 | De Los Santos . |
| 5,818,683 | 10/1998 | Fujii . |
| 5,830,591 | 11/1998 | Sengupta et al. . |
| 5,834,975 | 11/1998 | Bartlett et al. . |
| 5,870,007 | 2/1999 | Carr et al. . |
| 5,870,274 | 2/1999 | Lucas . |
| 5,872,489 | 2/1999 | Chang et al. . |

(List continued on next page.)

Primary Examiner—Anthony Dinkins
(74) Attorney, Agent, or Firm—Myers Bigel Sibley & Sajovec

(57) ABSTRACT

A tunable capacitor having low loss and a corresponding high Q is provided. The tunable capacitor includes first and second substrates having first and second capacitor plates disposed, respectively, thereon. The capacitor plates may include a high temperature superconductor material. A MEMS actuator, that is either driven by electrostatic force, heat or both, operably contacts the second substrate so that once the actuator is engaged it responds by displacing the second substrate, thereby varying the capacitance between said first capacitor plate and said second capacitor plate. As such, the capacitance can be controlled based upon the relative spacing between the first and second capacitor plates. The MEMS actuator may either be operably attached to the second substrate or detached, yet supporting, the second substrate.

38 Claims, 6 Drawing Sheets

U.S. PATENT DOCUMENTS

| | | |
|---|---|---|
| 5,880,921 | 3/1999 | Tham et al. . |
| 5,912,472 | 6/1999 | Voiglaender et al. . |
| 5,912,486 | 6/1999 | Summerfelt . |
| 5,914,553 | 6/1999 | Adams et al. . |
| 5,925,455 | 7/1999 | Bruzzone et al. . |
| 5,926,073 | 7/1999 | Hasegawa et al. . |
| 5,930,165 | 7/1999 | Johnson et al. . |

* cited by examiner

HIGH FREQUENCY TUNABLE CAPACITORS

FIELD OF THE INVENTION

The present invention relates generally to tunable capacitors and associated fabrication methods and, more particularly, to high frequency tunable capacitors and associated fabrication methods.

BACKGROUND OF THE INVENTION

Microelectromechanical structures (MEMS) and other microengineered devices are presently being developed for a wide variety of applications in view of the size, cost and reliability advantages provided by these devices. For example, one advantageous MEMS device is a variable capacitor in which the interelectrode spacing between a pair of electrodes is controllably varied in order to selectively vary the capacitance between the electrodes. In this regard, conventional MEMS variable capacitors include a pair of electrodes, one of which is typically disposed upon and fixed to the substrate and the other of which is typically carried by a movable actuator or driver. In accordance with MEMS technology, the movable actuator is typically formed by micromachining the substrate such that very small and very precisely defined actuators can be constructed.

While a variable or tunable capacitor can be utilized for many applications, tunable filters frequently utilize variable capacitors in order to appropriately tune the filter to allow or reject signals having predetermined frequencies, while, correspondingly, allowing or rejecting signals having other frequencies. For tunable filters that are utilized for high frequency applications, such as applications involving radio frequency (RF) signals, the tunable filter preferably has low signal loss and a high Q, i.e., a high quality factor. Unfortunately, variable capacitors that include electrodes formed of conventional metals generally do not have a sufficiently high Q for high frequency applications. While electrodes formed of high temperature superconductor (HTS) materials would advantageously increase the Q of the resulting variable capacitor, the use of HTS materials is generally not compatible with the micromachining techniques, such as required to fabricate the actuator of a conventional MEMS variable capacitor. For example, the chemicals, i.e., the etchants, utilized during the micromachining of a substrate would likely damage the superconductor materials by altering their performance characteristics.

As such, MEMS variable capacitors that have improved performance characteristics are desired for many applications. For example, tunable filters having a higher Q so as to be suitable for filtering high frequency signals are desirable, but are currently unavailable.

SUMMARY OF THE INVENTION

A tunable capacitor is therefore provided that is micromachined so as to be precisely defined, extremely small and provide microelectromechanical actuation. In one embodiment the capacitor plates are formed of a high-temperature superconductor material. As such the tunable capacitor can be utilized for a wide variety of high performance applications having a high Q requirement. For example, a tunable filter using a tunable high Q capacitor and inductor can appropriately filter high frequency signals, such as radio frequency (rf) signals.

The tunable capacitor includes a first substrate having at least one first capacitor plate disposed thereon. The first capacitor plate may be formed of a high-temperature superconductor material. Additionally, the tunable capacitor includes a second substrate having a second capacitor plate disposed thereon. The second capacitor plate may be formed of a high-temperature superconductor material. The tunable capacitor also comprises a microelectromechanical (MEMS) actuator that is operably in contact with the second substrate so that when an electrostatic force is applied to the actuator it responds by displacing the second substrate, thereby varying the capacitance between the first capacitance plate and the second capacitance plate. Generally, the substrates may be comprised of a low signal loss material that is compatible with the high-temperature superconductor materials typically used to form the capacitor plates.

In one embodiment of the invention, the MEMS acuator comprises an electrostatic actuator that includes at least one first electrode formed on the surface of the first substrate and at least one cantilever structure that contacts the second substrate and provides for at least one second electrode. The electrodes can be fabricated from a variety of materials. For example, the first electrode may comprise a high-temperature superconductor material and the second electrode may comprise silicon or gold. The cantilever structure may be operably attached to the second substrate or alternatively, the cantilever structure may support, but be detached from, the second substrate. In the embodiment in which the cantilever structure is operably attached to the second substrate, spring-like structures may be patterned in the cantilever structure to facilitate elasticity in the cantilever structure and the second substrate. In the embodiment in which the cantilever structure is detached from the second substrate, spring-like structures may be attached to and connect the first and second substrates so as to facilitate elasticity in the second substrate.

In yet another embodiment of the invention the tunable capacitor includes a first substrate having at least one first capacitor plate disposed thereon. The first capacitor plate may be formed of a high-temperature superconductor material. Additionally, the tunable capacitor includes a second substrate having a second capacitor plate disposed thereon. The second capacitor plate may be formed of a high-temperature superconductor material. The tunable capacitor also comprises a MEMS actuator that is operably in contact with the second substrate so that when thermal actuation is applied the actuator responds by displacing the second substrate, thereby varying the capacitance between the first capacitor plate and the second capacitor plate. Generally, the substrates may be comprised of a low signal loss material that is compatible with the high-temperature superconductor materials typically used to form the capacitor plates.

In one embodiment of the invention, the MEMS acuator comprises a thermal bimorph actuator that includes at least two layers, the first layer disposed on the first substrate and the second layer disposed on the first layer with the second layer also being operably in contact with said second substrate. The layers can be fabricated from a variety of materials. For example, the first layer may comprise silicon and the second layer may comprise gold. Characteristically, the first and second layers will comprise materials that have different coefficients of thermal expansion so that actuation is effected upon changing the temperature of the thermal bimorph. The thermal bimorph structure may be operably attached to the second substrate or alternatively, the thermal bimorph may support, but be detached from, the second substrate. In the embodiment in which the thermal bimorph structure is operably attached to the second substrate, spring-like structures may be patterned in the thermal bimorph to facilitate elasticity in the bimorph structure and the second substrate. In the embodiment in which the thermal bimorph structure is detached from the second substrate, spring-like structures may be attached to and connect the first and second substrates so as to facilitate elasticity in the second substrate.

According to another embodiment the tunable capacitor may be comprised so that the MEMS acuator can serve as either or both an electrostatic actuator and/or a thermal bimorph actuator. In this embodiment the cantilever structure that is operably in contact with the second substrate comprises at least two layers in which the layers comprise materials having differing coefficients of thermal expansion so that the cantilever structure may serve as a thermal actuator. In addition, a first electrode is disposed on the first substrate and a second electrode is formed within a layer of the cantilever structure. This embodiment of the invention can be connected to a voltage source to supply heat or an electrostatic force to thereby activate the actuator, causing displacement of the second substrate and resulting in variance of the capacitance between the first capacitance plate and the second capacitance plate.

Additionally, the present invention is embodied in a method for making a tunable capacitor. The method comprises fabricating a first capacitor plate construct formed of a first substrate having a first capacitor plate disposed thereon, the first capacitor plate, typically, comprising a high temperature superconductor material. A MEMS actuator, either an electrostatic actuator or a thermal bimorph actuator is then fabricated so that it is in operable contact with the first substrate. In one embodiment the MEMS actuator is attached to the first substrate and in another embodiment the MEMS actuator supports, but remains detached from, the first substrate. A second capacitor plate construct is fabricated of a second substrate having at least one second capacitor plate disposed thereon, the second capacitor plate, typically, comprising a high-temperature superconductor material. The tunable capacitor is completed by connecting the first capacitor plate construct having the operably contacted MEMS actuator to the second capacitor plate construct such that the MEMS actuator is disposed between the first and second capacitor plate constructs and is in operable contact with the first capacitor plate construct.

According to the present invention, a tunable capacitor and an associated fabrication method are provided which permit micromachining techniques to be used to fabricate a tunable capacitor actuated by electrostatic or thermal MEMS actuators. In one embodiment the tunable capacitor plates are formed of a high temperature, super conductor material. As such, the tunable capacitor can be precisely defined, small in size and MEMS actuated, while also having improved performance characteristics relative to conventional tunable capacitors. Thus, the tunable capacitors of the present invention can be used in a variety of applications, including those requiring high Q, such as, filtering signals having high frequencies.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
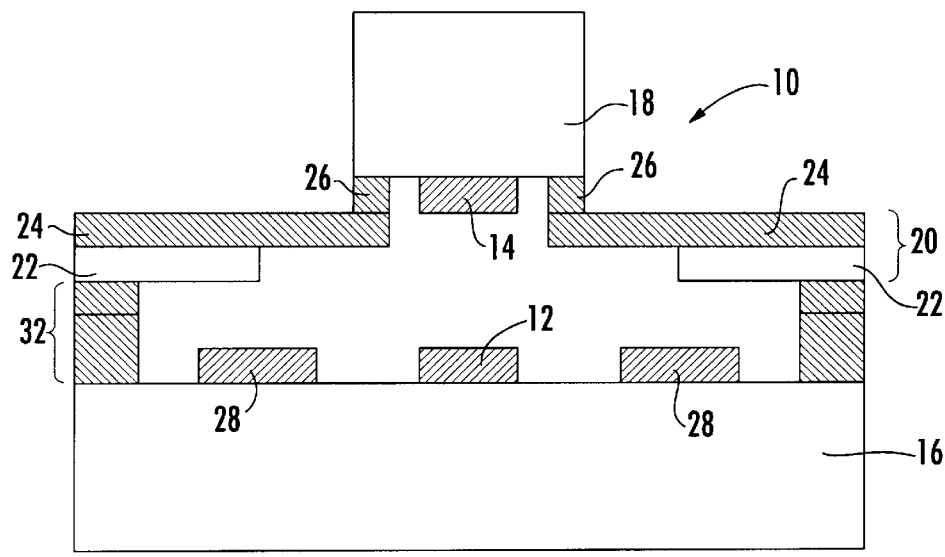
FIG. 1 is a cross-sectional view of a tunable capacitor having a MEMS electrostatic actuator attached to the variable capacitor in accordance with one embodiment of the present invention.
Figure 2:
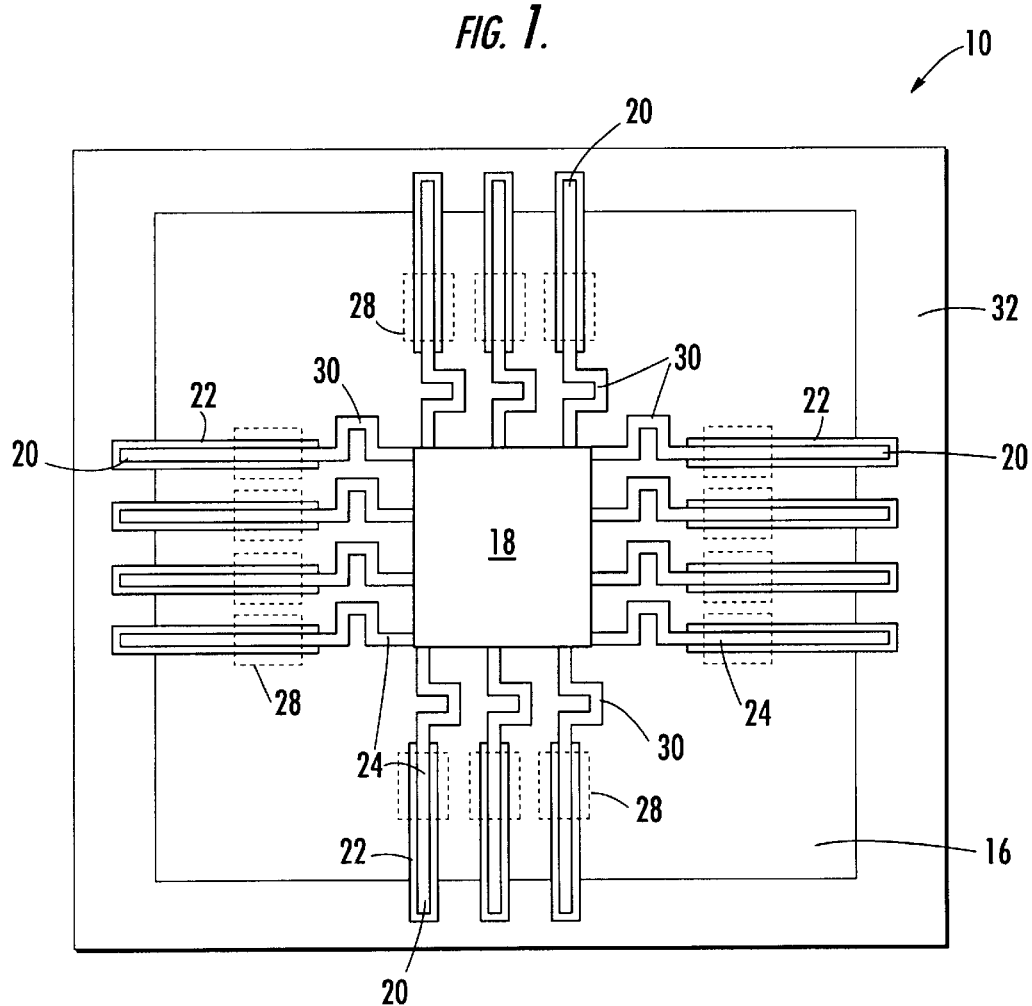
FIG. 2 is a plan view of the tunable capacitor of FIG. 1 in accordance with one embodiment of the present invention.

Referring to FIGS. 1 and 2 shown are cross-sectional and plan view schematics of the tunable capacitor 10 in accordance with a present embodiment of the present invention. FIG. 1 illustrates the variable capacitor of the tunable capacitor comprising a first capacitor plate 12 formed on the surface of first substrate 16 and a second capacitor plate formed on the surface of a second substrate 18. To achieve the desired low loss and high Q required of a tunable capacitor used in high frequency applications, such as those that involve radio frequency (RF) signals, the first and second capacitor plates may be formed of a high temperature super conducting (HTS) material. By way of example, these HTS materials include, Yttrium Barium Copper Oxide (YBCO) and Thallium compounds (TBCCO). These HTS materials are available commercially from Superconductor Technologies Incorporated of Santa Barbara, Calif. In order to insure a low loss filter the first and second substrates are, generally, formed of a low loss material. For example, the substrates may be formed of magnesium oxide (MgO), although other low loss materials, such as $LaAlO_3$ or $NdCaAlO_4$ may also be used for the first and second substrates.

The tunable nature of the capacitor is exhibited by altering the spacing between the second capacitor plate and the first capacitor plate thereby changing capacitance. In the embodiment shown in FIG. 1 displacement of the second capacitor plate is produced via electrostatic actuation of a cantilever actuator structure. The electrostatic cantilever actuator 20 comprises a first layer 22 and a second layer 24. In this embodiment the second layer of the cantilever actuator is physically attached to the second substrate 18. The layering construct of the cantilever actuator shown in FIG. 1 is by way of example, it is also possible and within the inventive concepts herein disclosed to comprise the cantilever actuator of a single layer or more than two layers. Additionally, the cantilever actuator may comprise one material or various materials. Characteristically, the material(s) that make up the cantilever actuator will provide electrical conductivity so as to act as an electrode, provide structural support for the second substrate and isolate the second capacitor plate 14 from materials that pose a threat to signal loss. As electrical voltage is supplied to the cantilever actuator it responds with displacement. The displacement of the cantilever actuator corresponds to deflection in the attached second substrate 18 and, likewise, capacitance varying deflection of the second capacitor plate 14.

In a present embodiment of the invention the first layer 22 of the cantilever actuator may act as the second electrode of the electrostatic actuator. It is also possible to configure the cantilever actuator so that the second layer acts as the second electrode of the electrostatic actuator. The first layer may be formed of a conductive material, such as silicon, although other suitable conductive materials may also be used to form the first layer. The second layer 24 of the actuator construct may comprise gold, although other suitable materials may be used to form the second layer. In this embodiment the second layer acts as a biasing element, provides a point of attachment to the second substrate 18 and structurally supports the second substrate. The second layer is connected to the second substrate through the intermediary support structure 26. The support structure forms the second intermediary layer of the overall tunable capacitor device. Additionally, the second layer, in the electrostatically actuated embodiment, provides for an electrical connection between an external voltage source (not shown in FIG. 1) and the first layer 22 (i.e. the second electrode). Additionally, the material(s) chosen to comprise the second layer should not provide a means for signal loss for the second capacitor plate 14. The second capacitor plate being, typically, formed of a HTS material is susceptible to signal loss if it lies in close proximity to loss-inducing materials. As shown in the plan view of FIG. 2 the second layer 24 of this embodiment may have spring-like structures 30 patterned during fabrication to provide for the requisite elasticity in the deflection of the second substrate.

The electrostatic actuation of the cantilever actuator is realized through at least one actuator electrode 28 formed on the first substrate 16. When different voltages are applied to the actuator electrode and the cantilever actuator, the electrostatic force results in the electrostatic cantilever actuator 20 being either attracted or repelled by the actuator electrode 28 resulting in the cantilever actuator being pulled down toward or pushed away from the actuator electrode, respectively. This actuation allows for the second substrate 18 and the attached second capacitor plate 14 to be deflected, thereby, varying the capacitance between the first and second capacitor plates. As shown in FIG. 2 the actuator electrode may be patterned on the first substrate as individual actuator electrodes 28. Alternatively, the actuator electrode may be one continuous ring shaped electrode formed beneath the pattern of cantilever actuators. The number and arrangement of individual actuator electrodes may vary in accordance with the number and arrangement of cantilever actuators. In a present embodiment, the actuator electrodes are formed of the same material as the first capacitor plate, typically, HTS material. While other conductive materials may be used to form the actuator electrodes it may be desirable to pattern and form the actuator electrodes during the same processing steps used to form the first capacitor plate 12 of the tunable capacitor.

By electrically connecting the first layer 22 (i.e. the second electrode) and the actuator electrode 28 (i.e. the first electrode) and the first and second capacitor plates 12, 14 to respective electrical leads in a manner known by those of ordinary skill in the art, the variable capacitor can be used in a tunable filter. By varying the spacing between the capacitor plates the filtering characteristics can be controllably modified to either allow or reject signals having a predetermined range of frequencies, while correspondingly rejecting or allowing signals having frequencies outside the predetermined range. Since the capacitor plates are, typically, constructed of an HTS material, the tunable capacitor is particularly advantageous for filtering signals having high frequencies, such as signals having radio frequencies.

The plan view of FIG. 2 shows, by way of example, an acceptable configuration of the cantilever actuators 20 leading from the tunable capacitor frame 32 to the underside surface (not shown in FIG. 2) of second substrate 18. The quantity and configuration of the cantilever actuators will be dependent upon many factors, including but not limited to, the desired robustness of the overall structure, the elasticity of the spring-like structures and the desired degree of capacitance variance in the tunable capacitor. FIG. 2 also illustrates an example of the top view relationship between the first layer 22 and second layer 24 of the cantilever actuators 20.

Figure 3:
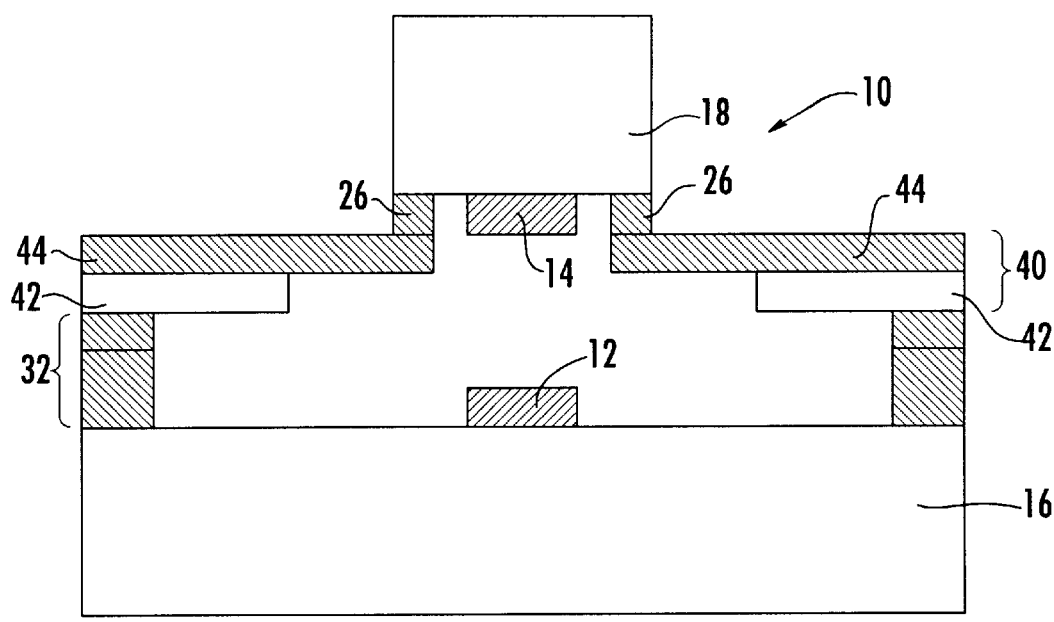
FIG. 3 is cross-sectional view of a tunable capacitor having a MEMS thermal bimorph actuator attached to the variable capacitor in accordance with another embodiment of the present invention.

FIG. 3 is a cross-sectional view of a tunable capacitor that incorporates the use of a thermal bimorph 40 as the actuator in accordance with another embodiment of the present invention. The variable capacitor of the tunable capacitor comprises a first capacitor plate 12 and a second capacitor plate 14 formed, respectively, on the surfaces of first substrate 16 and second substrate 18. In the same manner as the electrostatically actuated embodiment discussed above in FIGS. 1 and 2, the first and second capacitor plates may be formed of a high temperature super conducting (HTS) material. In order to insure low signal loss the first and second substrates, typically, comprise a low loss material, such as MgO or LaAlO$_3$.

Actuation in the FIG. 3 embodiment is accomplished by a thermal bimorph 40. The thermal bimorph structure includes two or more layers of materials having different thermal coefficients of expansion that respond differently to thermal actuation. Shown in FIG. 3 are first layer 42 and second layer 44 that comprise the thermal bimorph structure. In this embodiment when electrical current supplied by an external source (not shown in FIG. 3) is passed through the second layer and/or the first layer, the overall thermal bimorph structure becomes heated and responds by bending in the direction of the material having the lower coefficient of thermal expansion. In the embodiment shown in FIG. 3 the second layer 44 will comprise a higher thermal expansion material, such as gold, nickel or another metallic material. The first layer 42 will comprise a lower thermal expansion material, such as silicon or another suitable semiconductor material. This layering structure will cause the second layer to expand more readily upon application of heat. The expansion will cause the second layer to bend downwards toward the first layer. In effect the overall thermal bimorph structure will be displaced in a downward direction. This actuation allows for the second substrate 18 and the attached second capacitor plate 14 to be pulled down closer to the first capacitor plate 12; thereby, effectively varying the capacitance between the second and first capacitor plates.

In embodiments that use HTS materials to form the capacitor plates the tuning of the capacitor is accomplished by initially cooling the tunable capacitor to the superconducting temperature, for a YBCO HTS material this temperature has been determined to be 77 degrees Kelvin. At the superconducting temperature the HTS materials take on superconducting characteristics. For thermal bimorph structures, such as the one described above, the second layer that has the higher coefficient of expansion will contract more readily causing the overall bimorph actuator to move in the direction of the second layer. This actuation will result in the second substrate and the corresponding second capacitor plate moving away from the first substrate and the first capacitor plate. Once this initial displacement occurs, the capacitor is then tuned by heating the thermal bimorph. The heating operation will displace the second capacitor plate closer to the first capacitor plate. Typically, the temperature is increased above the superconducting temperature by about 100 degrees Kelvin. For electrostatic actuators the same initial cooling step is undertaken to activate the HTS material, although no subsequent heating is required as the capacitance is varied by applying an electrostatic force to the actuator. Depending on the materials used to form the cantilever actuator of the electrostatic embodiment, the cantilever actuator may respond to the initial cooling by affecting movement in the second substrate.

It should be noted that the thermal actuated embodiment of the present invention does not require the use of actuator electrodes 28 (shown in FIG. 1). Actuator electrodes are only required in applications where an electrostatic field is implemented to achieve actuation. Since the thermal bimorph-actuated, tunable capacitor does not rely on an electrostatic field there is no need to pattern actuator electrodes on the surface of the first substrate. However, it is possible, and within the inventive concepts herein disclosed to create a tunable capacitor per the present invention that may be actuated either thermally and/or electrostatically. In this embodiment the filter may be tuned by providing electrostatic acuation, thermal actuation or a combination of both thermal and electrostatic actuation. In the dual electrostatic/thermal actuation embodiment the actuator electrode(s) 28 will be required to be formed on the surface of the first substrate. The actuator electrodes may be formed of a suitable HTS material. While other conductive materials may be used to form the actuator electrodes it may be desirable to pattern and form the actuator electrodes during the same processing steps used to form the first capacitor plate 12 of the tunable capacitor. Additionally, in the dual electrostatic/thermal actuation embodiment the actuator cantilevers will be required to be at least two layers of differing materials with the layers characteristically having contrasting thermal coefficients of expansion (i.e. a bimorph).

Figure 4:
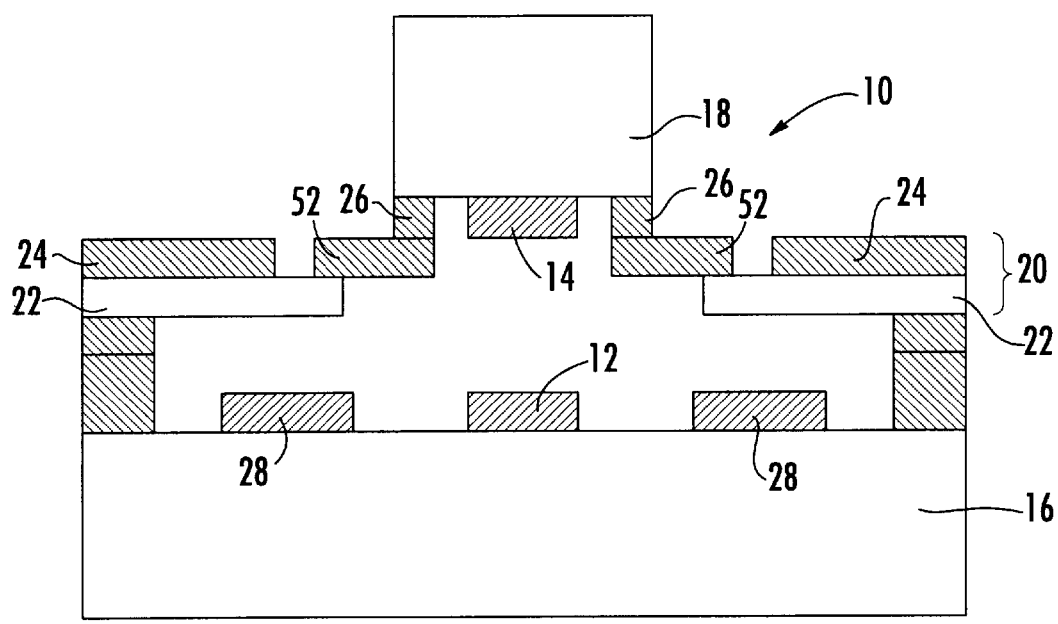
FIG. 4 is a cross-sectional view of a tunable capacitor having a MEMS electrostatic actuator supporting but detached from the variable capacitor in accordance with another embodiment of the present invention.
Figure 5:
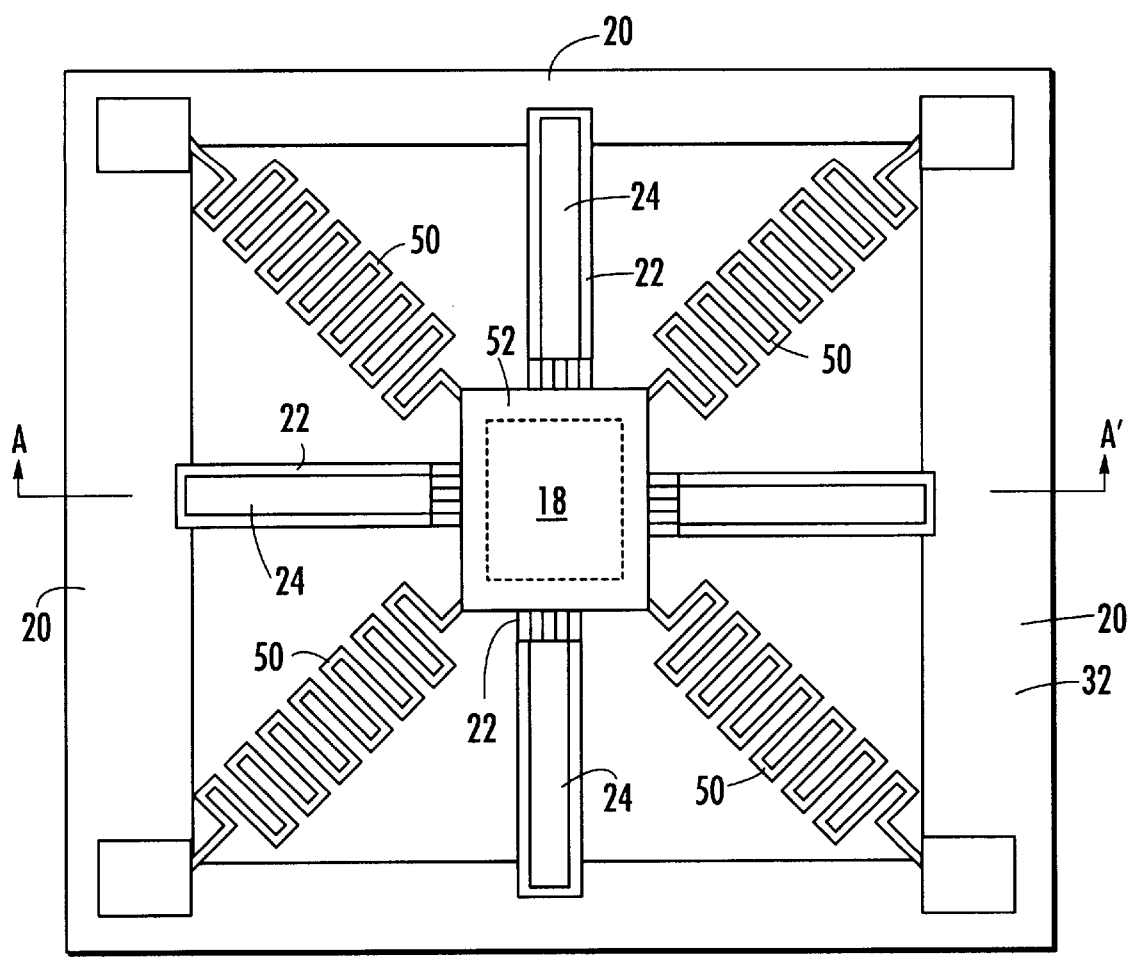
FIG. 5 is a plan view of the tunable capacitor of FIG. 4 in accordance with one embodiment of the present invention.

Referring to FIGS. 4 and 5 shown are cross-sectional and plan view schematics of the tunable capacitor 10 in accordance with another present embodiment of the present invention. In this embodiment of the invention the second substrate 18 is physically attached to the frame 32 by the spring-like structures 50 (shown in FIG. 5). The actuator member in this configuration, either an electrostatic cantilever actuator or a thermal bimorph, is not physically attached to the second substrate or the support structure 26. The actuator member in this embodiment serves the isolated purpose of providing the force necessary to deflect the second capacitor plate 14. This embodiment provides for a less constrained actuator that is free to provide greater movement and thereby impart more deflection to the second capacitor plate. Greater deflection in the capacitor plate provides for a wider range of capacitance in the tunable capacitor.

FIG. 4 depicts the electrostatic cantilever version of the tunable capacitor 10. Similar to the embodiments previously discussed, FIG. 4 shows the variable capacitor of the tunable capacitor comprising a first capacitor plate 12 and a second capacitor plate 14 formed, respectively, on the surfaces of first substrate 16 and second substrate 18. The first and second capacitor plates may be formed of a high temperature super conducting (HTS) material. The first and second substrates are, typically, formed of a low loss material in order to increase the Q of the resulting variable capacitor. For example, the substrate may be formed of magnesium oxide (MgO), although other low loss materials, such as LaAlO$_3$ or NdCaAlO$_4$ may also be used for the first and second substrates.

The electrostatic cantilever actuator 20 comprises a first layer 22 and a second layer 24 with the first layer structurally supporting the second substrate 18, but not being physically attached to the second substrate or the support structure 26. The support structure is attached to a support platform 52 that is formed during the second layer processing stage. A releasing process allows for the support platform to rest atop the first layer of the cantilever actuator without being physically attached to the first layer. The support platform has spring-like structures 50 (shown in FIG. 5) physically connecting the support platform and the second substrate to the frame 32. The layering construct of the cantilever actuator shown in FIG. 4 is by way of example; it is also possible and within the inventive concepts herein disclosed to comprise the cantilever actuator of a single layer or more than two layers. Additionally, the cantilever actuator may comprise one material or various materials. Characteristically, the materials that make up the cantilever actuator will provide electrical conductivity so as to act as an electrode and isolate the second capacitor plate 14 from materials that pose a threat to signal loss.

In a present embodiment of the invention the first layer 22 of the cantilever actuator may act as the second electrode of the electrostatic actuator. The first layer may be formed of a conductive material, such as silicon, although other suitable conductive materials may also be used to form the first layer. The second layer 24 of the actuator construct may comprise gold, although other suitable conductive materials may be used to form the second layer. In this embodiment voltage is supplied to the second layer of the cantilever actuator by an external voltage source (not shown in FIG. 4), the voltage is transferred to the first layer 22 and an electrostatic field is created between the first layer and an actuator electrode 28. This electrostatic force draws the cantilever actuator downward toward the stationary actuator electrode. This downward actuation causes the second substrate 18 and the second capacitor plate 14, which are structurally supported by, but not physically attached to, the cantilever actuator, to deflect downward. This deflection varies the capacitance between the second and first capacitance plates.

The electrostatic actuation of the cantilever actuator is realized through at least one actuator electrode 28 formed on the first substrate 16. As shown in FIG. 5 the actuator electrode may be patterned on the first substrate as individual actuator electrodes. Alternatively, the actuator electrode may be one continuous ring shaped electrode formed beneath the pattern of cantilever actuators. The number and arrangement of individual electrodes may vary in accordance with the number and arrangement of cantilever actuators. In a present embodiment, the actuator electrodes may be formed of HTS material. While other conductive materials may be used to form the actuator electrodes it may be desirable to pattern and form the actuator electrodes during the same processing steps used to form the first capacitor plate 12 of the tunable capacitor.

The plan view of FIG. 5 shows, by way of example, an acceptable configuration of the cantilever actuators 20 attached to the tunable capacitor frame 32 and leading to the underside surface (not shown in FIG. 5) of the support platform 52. Additionally, FIG. 5 shows, by way of example, an acceptable configuration for the spring-like structures 50 attached to the tunable capacitor frame and the support platform. The spring-like structures serve to provide elasticity and additional structural support to the second substrate 18. The physical design of the springs is shown by way of example, other spring designs can be used without departing from the inventive concepts herein disclosed. The quantity and configuration of the cantilever actuators and the spring-like structures will be dependent upon many factors, including but not limited to, the desired robustness of the overall structure, the elasticity of the spring-like structures and the desired degree of capacitance variance in the tunable capacitor. FIG. 5 also illustrates the top view relationship between the second substrate 18 and the underlying support platform 52.

Figure 6:
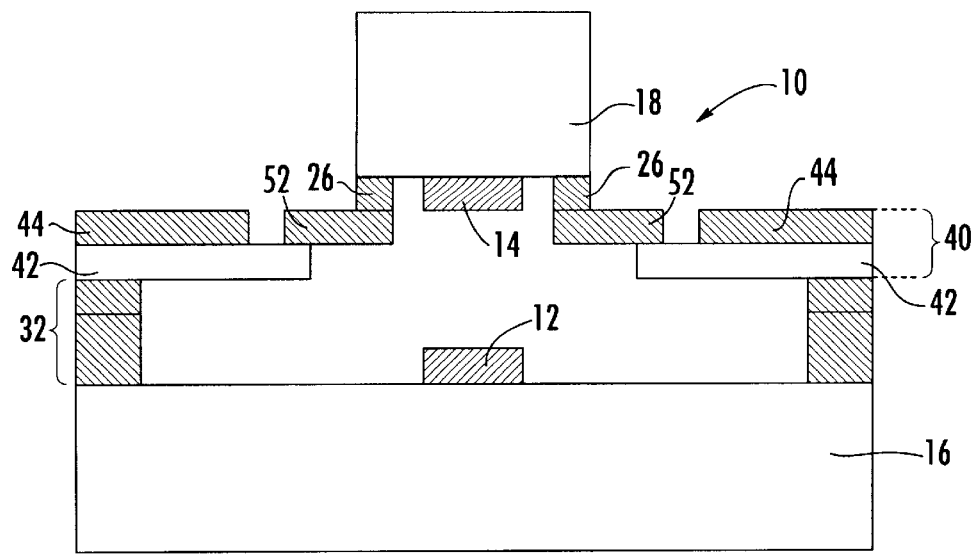
FIG. 6 is a cross-sectional view of a tunable capacitor having a MEMS thermal bimorph actuator supporting but detached from the variable capacitor in accordance with one embodiment of the present invention.

FIG. 6 is a cross-sectional view of a tunable capacitor that incorporates the use of thermal actuation in accordance with one embodiment of the present invention. The variable capacitor of the tunable capacitor comprises a first capacitor plate 12 and a second capacitor plate 14 formed, respectively, on the surfaces of first substrate 16 and second substrate 18. In the same manner as the electrostatically actuated embodiment discussed above in FIGS. 4 and 5, the first and second capacitor plates may be formed of a high temperature super conducting (HTS) material. In order to insure a low loss filter the first and second substrates, generally, comprise a low loss material, such as MgO or LaAlO$_3$.

Actuation in the FIG. 6 embodiment is accomplished by a thermal bimorph 40. The thermal bimorph structure includes two or more layers of materials having different thermal coefficients of expansion that respond differently to thermal actuation. Shown in FIG. 6 are first layer 42 and second layer 44 that comprise the thermal bimorph structure. The second layer will comprise a higher thermal expansion material, such as gold, nickel or another metallic material. The first layer will comprise a lower thermal expansion material, such as silicon or another suitable semiconductor material. As previously discussed in embodiments using HTS capacitor plates, this structural relationship will cause the second layer to contract more readily during the initial super cooling process. This will cause the overall bimorph actuator to move in the direction of the second layer. This actuation will result in the second substrate and the corresponding second capacitor plate moving away from the first substrate and the first capacitor plate. Once this initial displacement occurs, the capacitor is then tuned by heating the thermal bimorph. The heating operation will displace the second capacitor plate closer to the first capacitor plate. This actuation allows for the second substrate 18 and the second capacitor plate 14 to be deflected down closer to the first capacitor plate 12; thereby, effectively varying the capacitance between the second and first capacitor plates.

As previously discussed it is possible, and within the inventive concepts herein disclosed to create a tunable capacitor per the actuator support mechanism of FIGS. 4–6 that may be actuated either thermally and/or electrostatically. In the dual electrostatic/thermal actuation embodiment the actuator electrode(s) 28 will be required to be formed on the surface of the first substrate 16. Additionally, in the dual electrostatic/thermal actuation embodiment the actuator cantilevers 20 will be required to be at least two layers of differing materials with the layers characteristically having contrasting thermal coefficients of expansion (i.e. a bimorph).

As shown in FIGS. 1–6, the first substrate has one first capacitor plate. It is also possible and within the inventive concepts herein disclosed to dispose two first capacitor plates on the surface of the first substrate. In the instance where two capacitor plates are disposed on the first substrate, the second capacitor plate disposed on the second substrate is used to vary the capacitance between the two first capacitor plates. In this sense, the second capacitor plate serves as a bridge to control the field between the two first capacitor plates on the first substrate.

Characteristically HTS materials are generally not compatible with the silicon micromachining used to fabricate MEMS actuators. Therefore, in accordance with a method for fabrication of the tunable capacitors of the present invention, the filter and the MEMS actuators are fabricated separately and then assembled into a tunable capacitor structure.

Figure 7A:
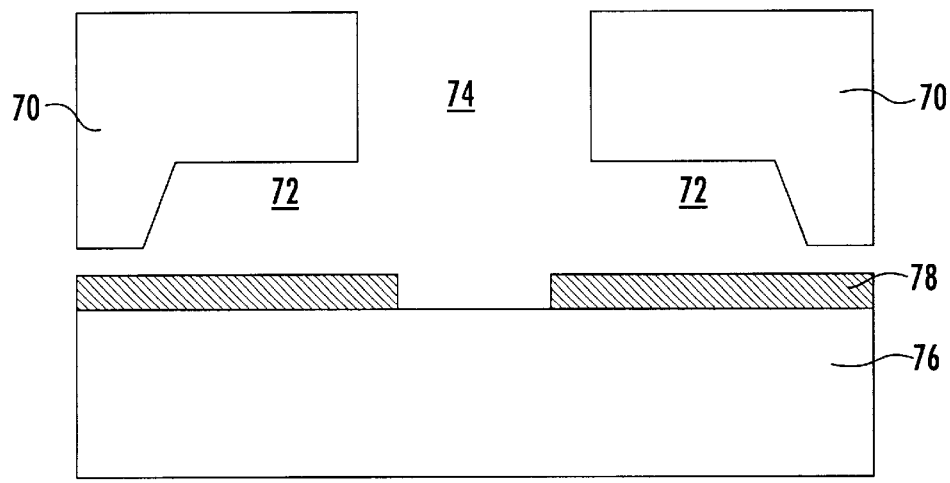
FIGS. 7A–7E are cross-sectional views of the various processing stages used to fabricate th tunable capacitors of the present invention in accordance with one embodiment.

FIGS. 7A–7E illustrate various processing steps in the method for fabricating the tunable capacitors in accordance with an embodiment of the present invention. It will be understood by those having ordinary skill in the art that when a layer or element is described herein as being "on" another layer or element, it may be formed directly on the layer, at the top, bottom or side surface area, or one or more intervening layers may be provided between the layers. Referring to FIG. 7A shown is a cross-sectional view of two silicon wafers used in the fabrication of the tunable capacitor. The first silicon wafer 70 (not shown in FIGS. 1–6) is used as a cap for the overall tunable capacitor and serves to facilitate the mounting of the second substrate 18 (not shown in FIG. 7A). The use of silicon wafers is shown by way of example, other semiconductor substrate materials may be used to form the cap structure. A cavity 72 and opening 74 are etched in the first silicon wafer in accordance with the configuration and dimensions of the overall tunable capacitor and the second substrate. Preferably, a conventional wet etch procedure is used to form the cavity and a dry etch process is used to form the opening in the first silicon wafer.

The second silicon wafer 76 has a gold layer 78 deposited on the topside surface of the wafer. The structures that comprise the gold layer are deposited using conventional mask, photoresist and electroplating processes or a standard evaporation process. These processes are well known by those having ordinary skill in the art. The gold layer is preferably about 5 to about 6 microns in thickness, although other gold layer thicknesses may be suitable. The second silicon wafer is used to form the first layer 22 or 42 of the cantilever actuator 20 and/or thermal bimorph 40, as well as, a portion of the frame 32 of the tunable capacitor. As discussed previously, the use of silicon as a layering material in the cantilever actuator and the thermal bimorph is by way of example only, other similar materials may be used to create layers of the cantilever actuator and the thermal bimorph.

The gold layer 78 is used to form the second layer 24 or 44 of the cantilever actuator 20 and/or thermal bimorph 40. Additionally, in the embodiment having the cantilever actuator and/or thermal/bimorph detached from the second substrate (as shown in FIGS. 4–6) the gold layer is also used to form the substrate platform 52 and the spring-like structures 50. In the application having the detached cantilever actuator and/or thermal bimorph a release layer (not shown in FIG. 7A) may be disposed between the second silicon wafer and the gold layer. After the second silicon wafer is polished back and masking and etching are performed to define the silicon structure, (see FIG. 7C), a time dependant wet etch process is used to release the substrate platform from the underlying silicon layer. The release process serves to detach the cantilever actuator and/or thermal bimorph from the second substrate 18.

Prior to placing the second substrate in the opening, the support structure 26 and the second capacitor plate 14 are formed on the underside surface of the second substrate 18. The support structure, which is formed around the periphery of the underside surface of the second substrate preferably, comprises gold. Gold is preferred because the support structure is, typically, in close proximity to capacitor plate formed of HTS and gold has low signal loss characteristics. Other low signal loss materials could also be used to fabricate the support structure. The support structure is typically disposed on the second substrate by a conventional masking and evaporation process. The support structure forms the second intermediary layer of the completed tunable capacitor device. The second capacitor plate, which may comprise a HTS material, is disposed on the underside surface of the second substance. In instances where both the support structure and the buffer layer comprise gold a single masking and evaporation process may be used to dispose the gold layer. In embodiments having the capacitor plate formed of HTS it is then patterned and disposed on the substrate using standard Metal Organic Chemical Vapor Deposition (MOCVD) techniques or Pulsed Laser Deposition (PLD) techniques. The use of MOCVD and PLD techniques is well known by those of ordinary skill in the art. The resulting capacitor plate is preferably about 3 to about 4 microns in thickness, although other capacitor plate thicknesses may be suitable. Once the support structures and capacitor plates have been formed on the substrate it may then be diced into the individual circuits that are subsequently placed in the opening 74 of the first silicon wafer 70.

Figure 7B:
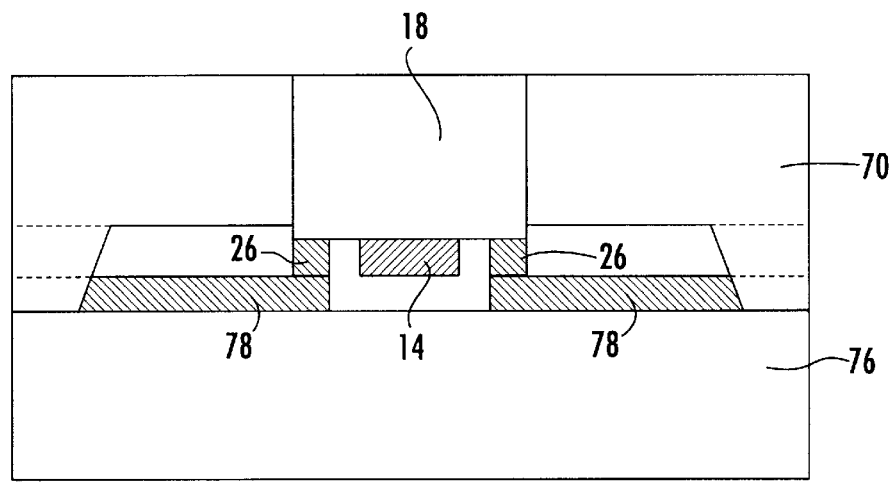

FIG. 7B shows a cross-sectional view of silicon wafers 70 and 76 after they have been bonded together. Additionally, the second substrate 18 has been placed into the opening 74 and bonded to the gold layer 78. A low temperature eutectic bond is typically used to bond the two silicon wafers together. In the application where the second layer 24 or 44 is formed of gold and the support structure 26 is formed of gold, a conventional gold to gold (Au—Au) eutectic bond procedure may be used to bond the second substrate to the second layer.

Figure 7C:
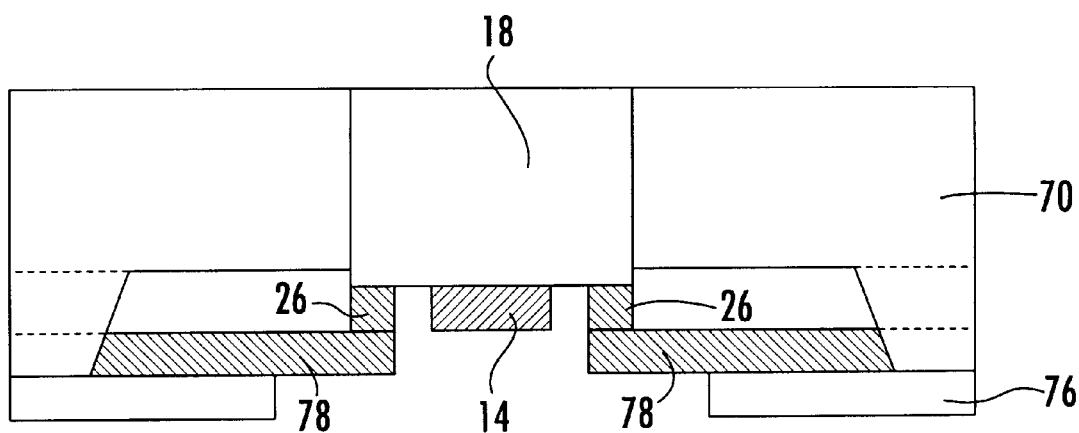

Referring to FIG. 7C shown is a cross-sectional view of the tunable capacitor construct after the second silicon wafer 76 has been polished back to the desired thickness and the first layer of the cantilever actuator and/or thermal bimorph has been patterned and fabricated in the second silicon wafer. The desired thickness will be dependent upon the configuration of the first layer of the cantilever actuator and/or thermal bimorph. Typically, the silicon wafer may be polished back to about 5 to about 6 microns, although any other suitable silicon thickness may be desirable. After the silicon has been polished back the first layer or actuator/bimorph beams are patterned and a conventional dry etch process is undertaken to fabricate the desired mechanical structure.

Figure 7D:
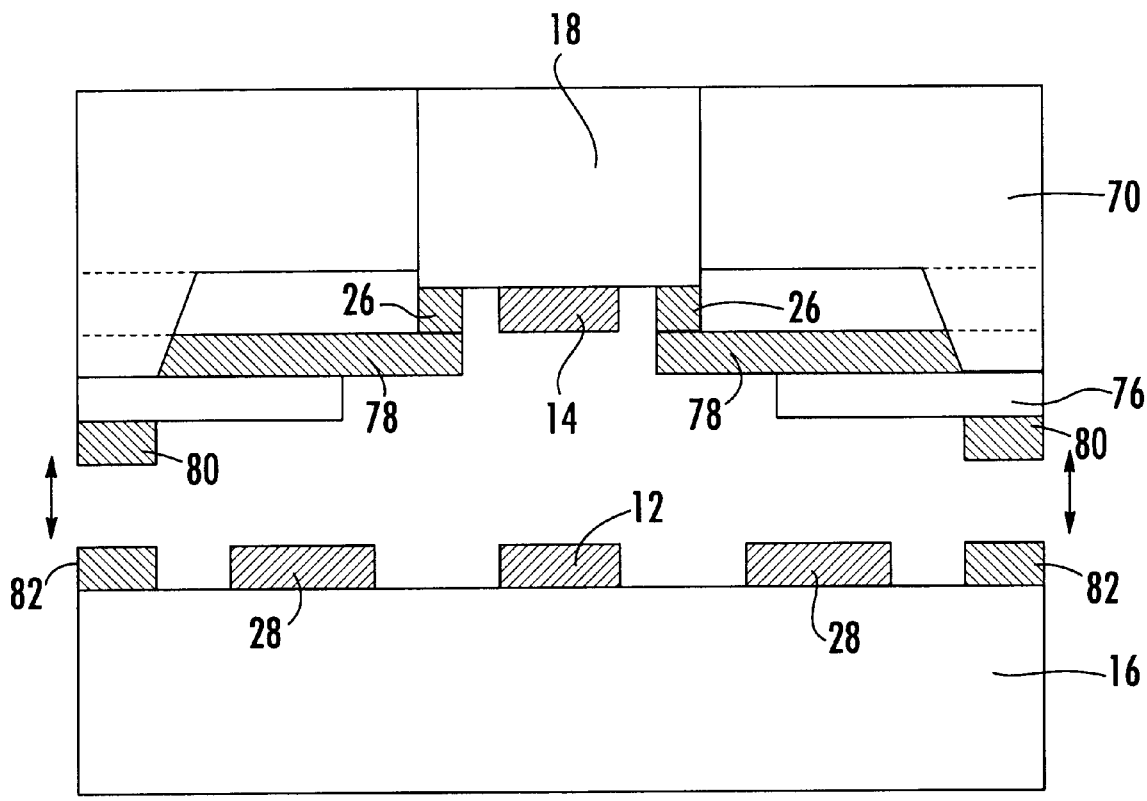

FIG. 7D shows a cross-sectional view of the second substrate 18 and the first substrate 16 prior to the two constructs being bonded together to form the tunable capacitor of the present invention. A first bonding pad 80 is disposed on the underside surface of the silicon layer 76 and a second bonding pad 82 has been electroplated or evaporated around the periphery of the first substrate 16. The first and second bonding pads, preferably, comprise gold and serve as the attachment point for bonding the second substrate of the tunable capacitor to the first substrate of the tunable capacitor. In the completed tunable capacitor construct (shown in FIG. 7E) the bonding pads 80, 82 form the first intermediate layer 84 of the overall tunable capacitor device.

The first substrate 16 is similar in fabrication to the second substrate 18. The first substrate has second bonding pad 82 formed around the periphery of the topside surface of the first substrate. The second bonding pad, preferably, comprises gold. The first capacitor plate 12, which may comprise a HTS material, is disposed on the topside surface of the first substrate. The capacitor plate and, in the electrostatic embodiment, the actuator electrodes 28 are then patterned and formed on the substrate using standard Metal Organic Chemical Vapor Deposition (MOCVD) techniques or Pulsed Laser Deposition (PLD) techniques. In embodiments of the present invention using only a thermal bimorph for actuation the actuator electrodes are not warranted. The resulting capacitor plate and actuator electrodes are preferably about 3 to about 4 microns in thickness, although other thickness may be suitable.

Figure 7E:
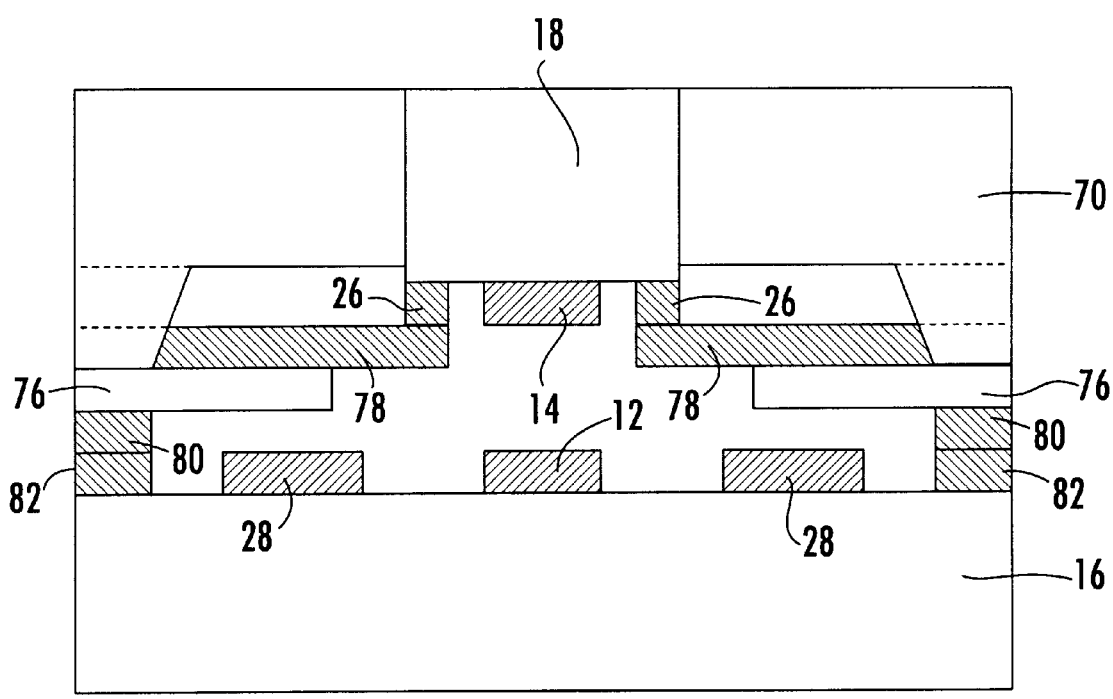

Referring to FIG. 7E shown is a cross-sectional view of the completed tunable capacitor. The first bonding pad 80 of the second substrate construct is bonded to the second bonding pad 82 of the first substrate construct. In applications where the first and second bonding pad are formed of gold, a standard gold-to-gold eutectic bonding procedure may be used to form the attachment that completes the fabrication of the tunable capacitor.

Accordingly, the fabrication method of this aspect of the present invention provides an efficient and repeatable technique for introducing the use of high temperature superconductor materials as capacitors in the field of micromachined tunable capacitors. As such, the resulting tunable capacitor can be precisely defined, small in size and MEMS actuated, while also having improved performance characteristics relative to conventional tunable capacitors. Thus, the tunable capacitors of the present invention can be used in a variety of applications, including those requiring high Q, such as, filtering signals having high frequencies.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A tunable capacitor comprising:
   a first substrate having a first surface;
   a first capacitor plate disposed on the first surface of said first substrate;
   a second substrate having a first surface;
   a second capacitor plate disposed on the first surface of said second substrate, wherein said first and second substrates are positioned such that said first and second capacitor plates face one another in a spaced apart relationship; and
   a microelectromechanical actuator operably contacting said second substrate for displacing said second substrate in response to electrostatic forces, thereby varying the capacitance between said first capacitance plate and said second capacitance plate.

2. The tunable capacitor of claim 1, wherein said first and second capacitor plates further comprise a high temperature superconductor material.

3. The tunable capacitor of claim 2, wherein said first and second capacitor plates further comprise a high temperature superconductor yttrium compound.

4. The tunable capacitor of claim 2, wherein said first and second capacitor plates further comprise a high temperature superconductor thallium compound.

5. The tunable capacitor of claim 1, wherein said microelectromechanical actuator further comprises:
   at least one first electrode disposed on the first surface of said first substrate; and
   at least one cantilever structure at least partially overlying said first electrode and operably contacting said second substrate, said at least one cantilever structure comprising a second electrode.

6. The tunable capacitor of claim 5, wherein said at least one first electrode further comprises a high temperature superconductor material.

7. The tunable capacitor of claim 5, wherein said second electrode further comprises silicon.

8. The tunable capacitor of claim 5, further comprising a first intermediary layer disposed on the first surface of said first substrate intermediate said cantilever structure and said first substrate.

9. The tunable capacitor of claim 8, wherein said first intermediary layer further comprises gold.

10. The tunable capacitor of claim 5, further comprising a second intermediary layer disposed on the first surface of said second substrate intermediate said cantilever structure and said second substrate, wherein said second intermediary layer operably connects said second substrate to said cantilever structure.

11. The tunable capacitor of claim 10, wherein said first intermediary layer further comprises gold.

12. The tunable capacitor of claim 5, wherein said cantilever structure further comprises spring-like elements structurally patterned in said cantilever structure that provide elasticity for said cantilever structure.

13. The tunable capacitor of claim 5, wherein said cantilever structure further comprises a first layer comprising the second electrode and a second layer disposed on the first layer comprising a biasing element.

14. The tunable capacitor of claim 13, wherein said first layer further comprises silicon and said second layer comprises gold.

15. The tunable capacitor of claim 1, further comprising at least one spring-like structure operably connected to said second substrate, whereby said at least one spring-like structure provides elasticity for said second substrate.

16. The tunable capacitor of claim 1, wherein said first and second substrates further comprise low signal loss substrates.

17. The tunable capacitor of claim 16, wherein said first and second substrates further comprise magnesium oxide (MgO).

18. A tunable capacitor comprising:
   a first substrate having a first surface;
   a first capacitor plate disposed on the first surface of said first substrate;
   a second substrate having a first surface;
   a second capacitor plate disposed on the first surface of said second substrate, wherein said first and second substrates are positioned such that said first and second capacitor plates face one another in a spaced apart relationship; and
   a microelectromechanical actuator operably contacting said second substrate for displacing said second substrate in response to thermal actuation, thereby varying the capacitance between said first capacitance plate and said second capacitance plate.

19. The tunable capacitor of claim 18, wherein said first and second capacitor plates further comprise a high temperature super conductor material.

20. The tunable capacitor of claim 19, wherein said first and second capacitor plates further comprise a high temperature superconductor yttrium compound.

21. The tunable capacitor of claim 19, wherein said first and second capacitor plates further comprise a high temperature superconductor thallium compound.

22. The tunable capacitor of claim 18, wherein said microelectromechanical actuator further comprises a moveable composite structure having at least two layers, including:
   a first layer; and
   a second layer disposed on said first layer and operably contacting said second substrate, wherein said first layer responds differently to thermal actuation than said second layer.

23. The tunable capacitor of claim 22, wherein said first layer comprises one or more materials having a lower coefficient of thermal expansion than one or more materials comprising said second layer.

24. The tunable capacitor of claim 22, wherein said first layer comprises silicon.

25. The tunable capacitor of claim 22, wherein said second layer comprises gold.

26. The tunable capacitor of claim 22, further comprising a first intermediary layer disposed on the first surface of said first substrate intermediate said moveable composite structure and said first substrate.

27. The tunable capacitor of claim 26, wherein said first intermediary layer further comprises gold.

28. The tunable capacitor of claim 22, further comprising a second intermediary layer disposed on the first surface of said second substrate intermediate said moveable composite structure and said second substrate wherein said second intermediary layer operably connects said second substrate to said moveable composite structure.

29. The tunable capacitor of claim 28, wherein said first intermediary layer further comprises gold.

30. The tunable capacitor of claim 22, wherein said moveable composite structure further comprises spring-like elements structurally patterned in said second layer so as to provide elasticity for said moveable composite structure.

31. The tunable capacitor of claim 22, further comprising at least one spring-like structure operably connected to said second substrate, whereby said at least one spring-like structure provides elasticity for said second substrate.

32. The tunable capacitor of claim 18, wherein said first and second substrates further comprise a low signal loss substrate.

33. The tunable capacitor of claim 18, wherein said first and second substrates further comprise magnesium oxide (MgO).

34. A tunable capacitor comprising:
   a first substrate having a first surface;
   a first capacitor plate disposed on the first surface of said first substrate;
   a second substrate having a first surface;
   a second capacitor plate disposed on the first surface of said second substrate, wherein said first and second substrates are positioned such that said first and second capacitor plates face one another in a spaced apart relationship; and a microelectromechanical actuator operably contacting said second substrate for displacing said second substrate in response to a motive force selected from the group consisting of electrostatic force and thermal actuation, thereby varying the capacitance between said first capacitance plate and said second capacitance plate.

35. The tunable capacitor of claim 34, wherein said first and second capacitor plates further comprise a high temperature super conductor material.

36. The tunable capacitor of claim 34, wherein said microelectromechanical actuator further comprises:

at least one first electrode disposed on the first surface of said first substrate; and at least one cantilever structure at least partially overlying said first electrode and operably contacting said second substrate, said at least one cantilever structure comprising at least two layers and a second electrode.

37. The tunable capacitor of claim 36 wherein said cantilever structure further comprises a first layer and a second layer disposed upon said first layer, wherein said first layer responds differently to thermal actuation than said second layer.

38. The tunable capacitor of claim 36 wherein said first layer comprises one or more materials having a lower coefficient of thermal expansion than one or more materials comprising said second layer.

\* \* \* \* \*